Patented Dec. 6, 1927.

1,652,016

UNITED STATES PATENT OFFICE.

WALTER KRANNICH, OF LUDWIGSHAFEN-ON-THE-RHINE, HANS KRZIKALLA, OF MANNHEIM, AND CURT SCHUSTER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PRODUCTION OF EMULSIONS.

No Drawing. Application filed March 10, 1927, Serial No. 174,410, and in Germany March 10, 1926. Renewed November 2, 1927.

We have found that highly dispersed suspensions and emulsions or solutions (probably of a colloidal nature) which products are hereinafter to be comprised by the term "suspensions", of organic substances in inorganic or organic liquids in which the organic substances are insoluble or difficultly soluble, can be obtained by treating the said substances with the liquids in the presence of acid aryl esters of phosphoric acid which may be employed in the state of free esters or of salts. It is to be noted that the substances to be suspended should be free from phenolic hydroxyl groups. In this manner for example higher aliphatic or hydroaromatic alcohols or ketones, fatty substances such as oleic acid, aromatic bases, hydrocarbons, dyestuffs and the like can be converted into suspensions. Depending on the purpose for which the suspensions are to be employed it may often be advantageous to employ mixtures of several substances to be suspended, for example hydrocarbons in mixture with cyclohexanone and the like.

When the conditions of working are suitably chosen, the said substances are so finely dispersed that clear or slightly opalescent (probably colloidal) solutions are obtained which can be diluted for example with water without any constituents being separated.

The said phosphoric acid derivatives may also be employed in conjunction with other emulsifying agents such as soaps, Turkey red oil, sulfonic acids possessing soap-like properties and the like; by this means the resulting products may be imparted special properties, for example a high wetting power. In addition to the materials enumerated above, solvents for the substance to be dispersed may be present.

Generally the organic substances will be introduced into aqueous solutions of salts of acid aryl phosphates; however, often the acid aryl esters of phosphoric acid or their salts may be dissolved in or mixed with the organic substances with or without further additions. Such preparations when treated with water furnish directly stable emulsions.

The following examples will further illustrate how our invention may be carried out in practice, but the invention is not limited to these examples. The parts are by weight unless otherwise stated.

Example 1.

100 parts of sodium dicresyl phosphate are dissolved in 1000 parts of water, whereupon the solution is mixed with 174 parts of cyclohexanone. A clear solution is obtained which can be diluted with water as desired any may be employed as washing agent. Instead of cyclohexanone about the same amount of cyclohexanol may be employed.

Example 2.

1000 parts, by volume, of a 20 per cent solution of sodium dicresyl phosphate are mixed with 75 parts of oleic acid. A clear solution is obtained which may be diluted with water and may be employed for example in the textile industry.

Example 3.

75 parts of aniline are dissolved in 1000 parts, by volume, of a 20 per cent solution of sodium dicresyl phosphate. The resulting solution is slightly opalescent. It may be diluted with water.

Example 4.

A mixture of 120 parts of cyclohexanone and 60 parts of benzene is stirred into 1000 parts of a saturated solution of sodium dicresyl phosphate (of about 35 per cent strength). A highly viscous turbid solution is obtained which becomes clear when diluted with water.

Example 5.

1000 parts of indanthrene blue RS in paste form (see colour index No. 1106) are mixed with 10 parts of sodium dicresyl phosphate and dried. A powder is obtained which forms a highly dispersed suspension with water. Similar results are obtained with sodium monocresyl phosphate or sodium dinaphthyl phosphate.

Example 6.

1000 parts of indanthrene gold orange G in paste form (see Schultz, Farbstofftabellen, 6th edition, No. 760) are mixed with 10 parts of sodium diphenylphosphate or another salt of a diaryl phosphoric acid for example sodium dixylenyl phosphate, and dried. When the resulting mixture is mixed with water, a highly dispersed suspension is obtained.

What we claim is:

1. The process of preparing a suspension of an organic substance free from phenolic hydroxyl groups which consists in treating same with a liquid in which it is substantially insoluble, in the presence of an acid aryl ester of phosphoric acid.

2. The process of preparing a suspension of an organic substance free from phenolic hydroxyl groups and insoluble in water which consists in treating same with water in the presence of an acid aryl ester of phosphoric acid.

3. A composition of matter comprising an organic substance free from phenolic hydroxyl groups and an acid aryl ester of phosphoric acid.

4. A composition of matter comprising an organic substance free from phenolic hydroxyl groups and insoluble in water, and an acid aryl ester of phosphoric acid.

5. A composition of matter comprising an organic substance free from phenolic hydroxyl groups and insoluble in water, and an acid aryl ester of phosphoric acid and water.

6. A composition of matter comprising a dyestuff free from phenolic hydroxyl groups and insoluble in water, and an acid aryl ester of phosphoric acid.

In testimony whereof we have hereunto set our hands.

WALTER KRANNICH.
HANS KRZIKALLA.
CURT SCHUSTER.